Figure 1:
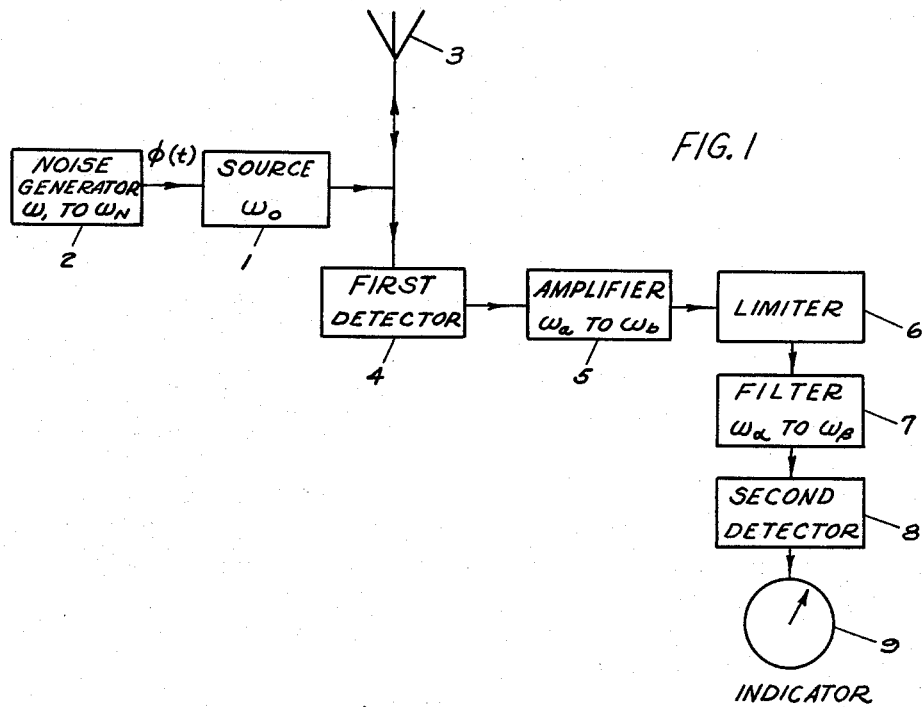

Nov. 1, 1960  T. J. REY  2,958,862
RADAR SYSTEM WITH RANDOM MODULATION OF FREQUENCY OR PHASE
Filed Sept. 21, 1956  2 Sheets-Sheet 1

THOMAS J. REY
INVENTOR.

BY Leonard Bloom
AGENT

THOMAS J. REY
INVENTOR.

BY Leonard Bloom
AGENT

United States Patent Office 2,958,862
Patented Nov. 1, 1960

2,958,862

RADAR SYSTEM WITH RANDOM MODULATION OF FREQUENCY OR PHASE

Thomas J. Rey, 1245 Guildford Road, Glen Burnie, Md., assignor of one-third to Leonard Bloom, Baltimore, Md.

Filed Sept. 21, 1956, Ser. No. 611,223

6 Claims. (Cl. 343—14)

The present invention relates to an improved frequency or phase modulated radar system that is modulated by a source of random signals.

Heretofore in the prior art, the development of radar systems has been channeled along certain narrow, well-defined techniques. Basically, radar transmission is either pulse modulated or continuous. Pulse radars transmit a series of brief pulses and the time delay between the transmitted pulse and any corresponding received pulse is a measure of the range of the target. On the other hand, CW (continuous wave) radars radiate a continuous wave that may be frequency or phase modulated, and the reflected wave is mixed with a portion of the transmitted wave to form an autodyne beat signal. The instantaneous or else average frequency of this beat signal is then a measure of the time delay between the radiator and the reflector, or in other words, it is a measure of the range of the target. Both pulse and conventional CW radars have their relative advantages, but in any event, the development of present day radars have been based largely on refinements in these basic techniques.

It is an object of the present invention to introduce an entirely new concept for the measurement of distances or time delays.

In accordance with the teachings of the present invention, a continuous wave is radiated that is modulated in frequency or phase by a source of random signals; the reflected wave is mixed with a portion of the transmitted wave to form an autodyne beat signal that is random (at least in part), and the particular Fourier spectrum of the random autodyne beat signal will have a root mean square value of frequency that depends on the distance to the reflector.

In accordance with another aspect of the present invention, a more accurate method of range determination that is particularly well-suited for scanning multiple targets, is to provide standard or local random autodyne beats for comparison with the received autodyne beat signal; and if the two beats are identical, then a target is present at the range corresponding to the time delay of the local autodyne beat signal.

Another aspect of the present invention is to detect or display only those targets which are moving, and/or to indicate their speed.

Another aspect of the present invention is to provide means of generating the standard or local autodyne beat signal for comparison with the received autodyne beat signal.

Figure 2:
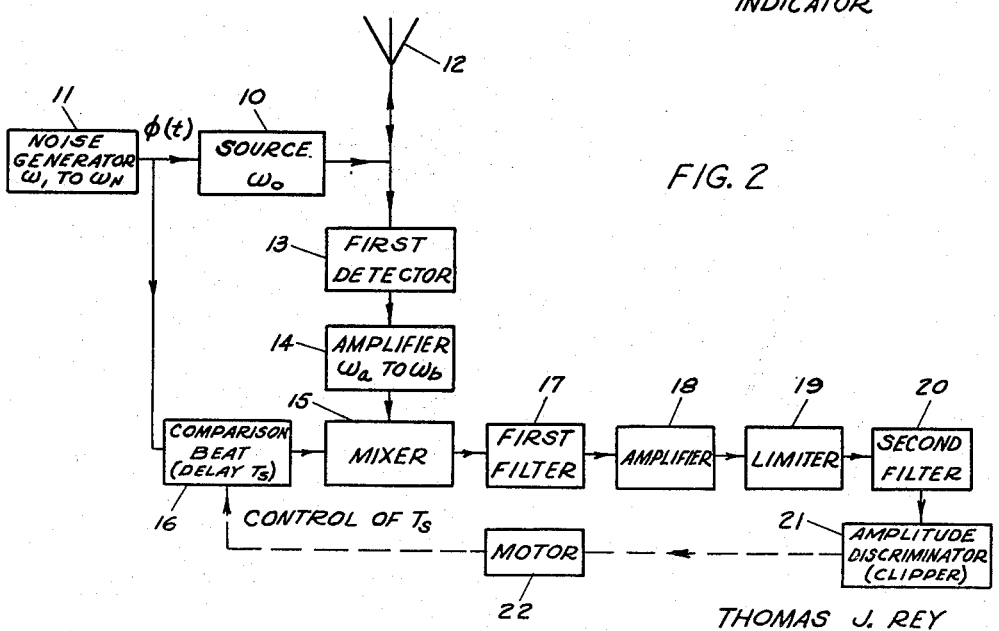
Figure 3:
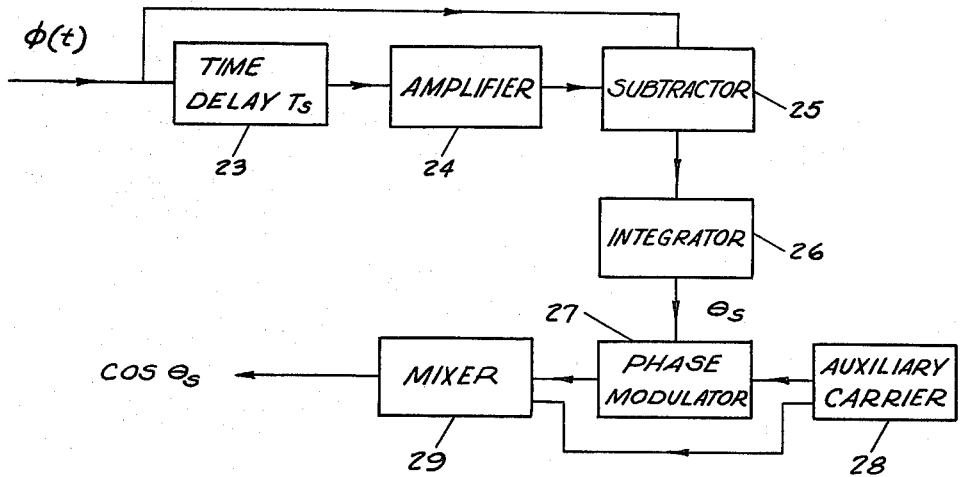
Figure 4:
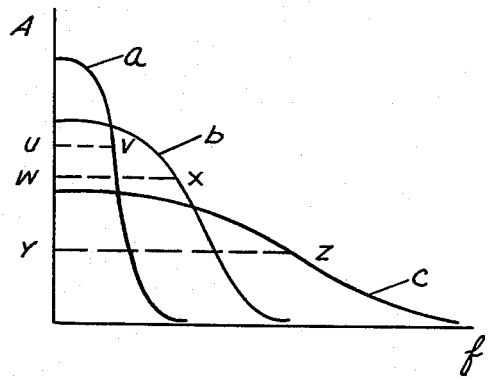
Figure 5:
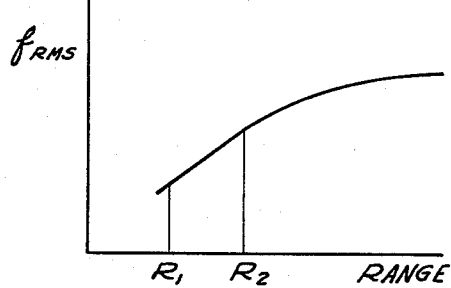

The foregoing objects, advantages, construction, and operation of the present invention will become more readily apparent from the following description and accompanying drawings, in which:

Figure 1 is a schematic diagram of one form of the present invention,

Figure 2 is a schematic diagram of a preferred embodiment of the present invention that is applicable to the scanning of multiple targets, Figure 3 is a schematic diagram of one method to generate the local comparison beat signals, Figure 4 is exemplary of the type of Fourier frequency spectra associated with the present invention, and Figure 5 shows how the root mean square value of a particular Fourier frequency spectrum varies with target range.

With reference to Figure 1, a source 1 of oscillations $\omega_0$ is frequency or phase modulated by a controlled source of random signals, such as noise generator 2. The randomly modulated wave is radiated by antenna 3, which also serves to receive the reflected wave. However, for maximum range sensitivity, separate transmitting and receiving antennas could be used. The received wave is mixed with a portion of the transmitted wave in first detector 4; the difference term of the product of the two signals is an autodyne beat that is at least partly random.

As shown in Figure 4, which is a plot of relative amplitude versus frequency, the Fourier spectra of this random autodyne beat signal comprises a family of curves, for example, a, b, and c, having root mean square values of frequency represented by the dotted lines UV, WX, and YZ, respectively. As further shown in Figure 5, these root mean square values of frequency are indicative of target range over a particular region $R_1$ to $R_2$.

The mean power of the random autodyne beat signal in a given frequency band depends both on the character of the modulation and on the target distance, and it is seen that the frequency spectrum of the autodyne beat widens with increasing time delay. If the particular Fourier frequency spectrum could be identified, a clear indication of the associated time delay, and hence the range, would be given; but such an identification would require very expensive and complicated spectrum analyzing equipment. It is quite sufficient for most purposes, however, as well as a good deal faster, to obtain an indication of the particular Fourier frequency spectrum by obtaining a measure of the root mean square value of frequency.

As shown in Figure 1, the random autodyne beat signal from first detector 4 is fed to an amplifier 5, whose action is similar to that of a wideband filter having cut-offs between $\omega_a$ and $\omega_b$. The effect of amplifier 5 is to cut-off the high frequency portions of the frequency spectrum. The resulting signal is fed into a limiter 6, which normalizes the wave form of the filtered autodyne beat signal and eliminates the effect of target size upon the determination of range. The effect of limiter 6 is much the same as an amplifier with strong AVC. The normalized autodyne beat signal is then fed into filter 7, which has a narrower bandwidth than amplifier 5. The effect of filter 7 is to take a fixed and relatively narrow slice of the Fourier spectrum. The area of the spectrum falling with the bounds of filter 7 is an indication of the particular root mean square value of frequency as well as an indication of the particular frequency spectrum in question; hence, it is a measure of relative time delay, or in other words, target range. Depending upon the design of filter 7, the area of the frequency spectrum falling within its band may vary directly or indirectly with target range. In either event, the output of filter 7 is fed to second detector 8, which may be a peak detector and/or an amplitude discriminator. The output of second detector 8 is then fed to a suitable indicator 9 to record the range directly.

Another aspect of the present invention that is more accurate and is particularly well-suited to the range scanning of multiple targets is exemplified by Figure 2. Here, a local autodyne beat signal that corresponds to a known time delay is compared with the received autodyne beat signal; and if the two beat signals are identical, then a target is present at the range corresponding to the known time delay of the standard or local autodyne beat signal. As before, a source 10 of oscillations $\omega_0$ is frequency or phase modulated by a controlled source of random signals, such as noise generator 11. The randomly modulated wave is radiated by antenna 12, which also may serve to receive the reflected wave. The received wave is mixed with a portion of the transmitted wave in first detector 13 to form an autodyne beat signal that is at least partly random. After suitable amplification by amplifier 14, the received autodyne beat signal is mixed in mixer 15 with the local autodyne beat signal that has been generated by comparison beat 16. The difference term of the product is obtained as the output of first filter 17. The output of first filter 17 is suitably amplified by amplifier 18 and limited by limiter 19 and is applied to second filter 20. The bandwidth of the second filter 20 is less than the bandwidth of the first filter 17, but still exceeds the Doppler frequency. The output of the second filter 20 is applied to an amplitude discriminator or clipper 21. The clipping threshold partially determines the range resolution of the system. The output of amplitude discriminator 21 is a maximum, that is, a rectangular wave repeating at the Doppler frequency, if the time delays associated with the two autodyne beat signals are identical. Although the two autodyne beat signals are at least in part random, they are nevertheless coherent, having originated with the same random noise generator. If the time delays of the received and the local autodyne beat signals are not identical, then the output of the second filter 20 is a mixture of a sinusoid at Doppler frequency and random noise within the frequency range of the second filter 20. The random components are dominant if the difference in time delays is so great that the R.M.S. value of the random phase angle exceeds the R.M.S. value of the Doppler modulation ($\pi^2/12$).

The present invention may be applied to a variety of apparatus that are directly concerned with the measurement of distance or time delays, such as: a radio altimeter for indicating the height of an aircraft; a collision warning radar for aircraft, ships, or the like; as well as various search or tracking radars. Moreover, the present invention is particularly well-suited to handling multiple targets, since comparison beat 16 may readily take the form of a parallel bank of standard time delays.

When the present invention is applied to a tracking radar, all or part of the time delay inherent in comparison beat 16 may be made variable. For example, in the case of a low pass filter, the series inductance and shunt capacitance are varied jointly so as to vary the time delay without affecting the characteristic impedance; other sections of the delay means may be fixed and provided with taps. The output of amplitude discriminator 21 then operates a device such as motor 22, which adjusts the amount of the local or standard delay until the amplitude is approximately a maximum. The corresponding time delay may then be displayed, and it corresponds to the range of the target being tracked.

When the radar is tracking, the cut-off frequency of the second filter 20 may be reduced to the highest Doppler frequency expected. The repetition rate of the rectangular wave at the output of the second filter 20 is the Doppler frequency and is thus proportional to the relative target speed. If this Doppler frequency is measured by a ratemeter, an indication is thus obtained of the target speed.

Moreover, a conventional PPI display may be obtained in connection with a conventional scanning antenna by linking the radial deflection of the cathode ray tube with the adjustment of the local time delay means. Target speed may then be indicated by modulating the tube grid with a voltage proportional to the Doppler frequency. It should be noted that in altering the delay, it may be necessary to modify the amount of post-delay amplification in order to compensate for any increase of attenuation with delay time. Also, the echoes from stationary targets may be suppressed by adjusting amplitude discriminator 21 to a sufficiently high clipping level.

The resolution of the system may be enhanced by several methods that are well-known in the art of radar techniques. For example, the amplification required after first detector 13 may be carried out at an intermediate frequency, say 30 megacycles, by introducing a suitable carrier into mixer 15. Moreover, the transmitting and receiving antennas may be separate, and the transmitting and receiving sections may be isolated from one another except for the controlled amount of transmitter signal which is introduced into first detector 13. Finally, the modulation voltage of the transmitter may contain a sinusoidal component so that the random modulation spectrum is advanced on the frequency scale; this step is well-known in the design of proximity fuses, and it reduces the effects of spurious amplitude modulation and microphonic noise.

Figure 3 illustrates one method of generating the standard or local autodyne beat signal that is used for comparison purposes. Part of the random modulation waveform (originating in noise generator 11 of Figure 2) is fed into time delay means 23, which may comprise a low pass filter or a cable. The output is then amplified in amplifier 24 to compensate for any attentuation incurred in time delay 23. (An attenuator from the source to subtractor 25 would also suffice.) The output of amplifier 24 is fed into subtractor 25, in which the delayed random modulation waveform is subtracted from the random signal originally fed into time delay 23. The difference is fed into integrator 26, which would not be necessary if the radiated carrier was phase modulated instead of frequency modulated. The integrated difference is then fed to phase modulator 27, which phase modulates an auxiliary carrier 28. The standard or local autodyne beat signal may then be developed by mixing the unmodulated auxiliary carrier and the phase modulated auxiliary carrier in mixer 29. Since the level of the auxiliary carrier cancels out in mixer 29, it is seen that the auxiliary carrier 28 need not correspond to the radiated carrier, but may be at any convenient frequency. The entire apparatus shown in Figure 3 corresponds to comparison beat 16 shown in Figure 2.

Another method of forming the standard autodyne beat is to delay part of the transmitted wave in a local delay means and to mix the amplified delayed output with the input to the delay means. Since the high average frequency of the carrier may make the realization of the delay means impracticable, it is preferred to mix part of the modulated carrier with a subsidiary sinusoidal carrier of a somewhat different mean frequency, and to use their difference term instead of the modulated carrier for generating the standard autodyne beat signal with the aid of a local delay means.

The present invention may be more clearly understood by a consideration of its underlying mathematical theory, which is as follows:

Let a carrier wave of frequency $f_0$ be modulated in frequency by a source of random voltage, and let the instantaneous random frequency deviation be $\phi(t)$. The time variation of the modulated signal may then be written:

(1) $$\cos\left[\omega_0 t + \int_0^t \phi(t)\,dt\right]$$

Similarly, the time variation of a received signal which has been delayed by the time T through reflection is:

(2) $$\cos\left[\omega_0(t-T) - \omega_D t + \int_0^{t-T} \phi(t)\,dt\right]$$

The beat resulting from the process of mixing these two signals is:

(3) $$\frac{1}{2} \cos [\omega_D t + \theta + \omega_0 T]$$

where, $\omega_D$ = Doppler frequency due to reflector motion relative to the transmitter, and (4) $$\theta = \int_{t-T}^{t} \phi(t) dt$$

The properties of random signals have been discussed by S. O. Rice in the Bell System Technical Journal, October 1944 and January 1945. Following Rice and assuming $\phi$ to be white Gaussian noise in the frequency band $(\omega_1, \omega_N)$; then:

(5) $$\phi(t) = \sum_{1}^{N} C_n \sin(\omega_n t + \epsilon_n)$$

Where $C_n$ and $\epsilon_n$ are random quantities. From Equations 4 and 5, (6) $$\theta = 2 \sum_{1}^{N} \frac{C_n}{\omega_n} \sin\left(\omega_n \frac{T}{2}\right) \sin\left[\omega_n \left(t - \frac{T}{2}\right) + \epsilon_n\right]$$

Denoting the time average of a quantity $x$ by $\bar{x}$, then if the root mean square of the random frequency deviation noted as $$\sqrt{\overline{\phi^2}} = \Omega$$

(7) $$\sqrt{\overline{\phi^2}} = \Omega$$

The statistical properties of Equation 6 are such that:

(8a) $$\lim_{\omega_N T \to 0} \overline{\theta^2} = (\Omega T)^2$$

(8b) $$\lim_{\omega_1 T \to \infty} \overline{\theta^2} = 2\Omega^2 / \omega_1 \omega_N$$

The system of the beat (Equation 3) may be represented by (9) $$\exp i (\omega_D t + \theta + \omega_0 T) = \exp i \omega_0 T \cdot \exp i \omega_D t \cdot \exp i \theta$$

The first term is D.C., and the second term is the Doppler frequency. The third term is D.C. plus a band spectrum and varies with delay time T.

If $$\overline{\theta^2} \ll \frac{\pi^2}{12}$$

the spectrum of the beat is essentially a pure Doppler frequency. However, if:

$$\overline{\theta^2} > \frac{\pi^2}{12}$$

The beat spectrum is essentially random.

For small delays $$(\omega_N T \ll 1)$$

(11) $$\exp i \theta \sim 1 + i\theta$$

is D.C. with a small white portion in the band $(\omega_1, \omega_N)$, as may be seen by inspection of Equation 6. The power contribution of $\theta$ to the band $(\omega_a, \omega_b)$, is:

(12) $$\omega_{a,b} = \overline{\theta^2} \left(\frac{\omega_b - \omega_a}{\omega_N - \omega_1}\right) \text{ if } \omega_1 \leq \omega_a < \omega_b \leq \omega_N$$

As T grows, the contribution of $\theta^2$ to the power series for $\exp i \theta$ contributes power into the band $(o_1 \omega_N - \omega_1)$, of amount $\Omega^4 T^4 / 4$; its contribution to the band $(\omega_\alpha, \omega_\beta)$ is:

(13) $$\omega_{\alpha,\beta} = \frac{\Omega^4 T^4 (\omega_\eta - \omega_\alpha)}{2(\omega_N - \omega_1)^2} \left[\omega \left(1 - \frac{\omega}{2(\omega_N - \omega_1)}\right)\right]_{\omega_\alpha}^{\omega_\beta}$$

if $$0 \leq \omega_\alpha < \omega_\beta \leq (\omega_N - \omega_1)$$

For large delays T such that $$\overline{\theta^2} \gg 1$$

the beat spectrum has a Gaussian frequency distribution, such that the power in the narrow band $\omega, \omega + \delta\omega$ is:

(14) $$\omega(\omega)_1 \delta\omega = \frac{\exp(-\omega^2 / \sqrt{2\overline{\theta^2}})}{\sqrt{2\pi \overline{\theta^2}}} \cdot \delta\omega$$

The variance is the r.m.s. instantaneous beat frequency:

(15) $$\overline{\theta^2} = 2\Omega^2 \frac{\left[1 - \cos(\omega_1 + \omega_N) \frac{T}{2} \sin(\omega_N - \omega_1) \frac{T}{2}\right]}{(\omega_N - \omega_1) \frac{T}{2}}$$

(15a) $$\to 2\Omega^2 \text{ as } \frac{\omega_N - \omega_1}{2} T \to \infty$$

(15b) $$\to \left(\frac{\Omega T}{2}\right)^2 \left[(\omega_1 + \omega_N)^2 + \frac{1}{62}(\omega_N - \omega^1)^2\right] \text{ as } \left(\frac{\omega_N - \omega_1}{2}\right) T \to 0$$

Hence, if $\Delta\omega$ is a band contained inside the greater band $\square\omega$, where $\square\omega$ is defined as a bandwidth greater than $\Delta\omega$ (This merely expresses the fact that the spectrum of $\theta$ broadens with increasing delay T.)

Then, the ratio:

(16) $$\frac{\text{Power in } \square\omega}{\text{Power in } \Delta\omega}$$

increases monotonically with $\overline{\theta^2}$, i.e., with delay time T up to

(17) $$T = \frac{\pi}{(\omega_1 + \omega_N)}$$

However, this restriction is avoided with the aid of a standard comparison signal:

(18) $$\cos \theta_s$$

Here $\theta_s$ is given by Equation 4 on replacing the reflector delay time T by the local standard delay $T_s$.

On mixing the signals described by Equations 3 and 18, they yield the difference terms:

(19) $$\cos (\omega_D t + \theta - \theta_s + \omega_0 T)$$

This contains the random argument:

(20)
$$(\theta - \theta_s) = 2 \sum_{1}^{N} \frac{C_n}{\omega_n} \sin \omega_n \left(\frac{T - T_s}{2}\right) \sin \omega_n \left(t - \frac{T_1 + T_s}{2}\right)$$

Clearly $\overline{(\theta - \theta_s)^2}$ becomes zero, and Equation 19 becomes a pure Doppler signal as $$T \to T_s$$

One method of generating the standard comparison signal (18) is as follows: The output of the random source is subjected to a standard delay $T_s$. The delayed random signal $\phi(t - T_s)$ is subtracted from the present signal $\phi(t)$ and the difference is integrated to form the signal:

(21) $$\theta_s = \int^{t} [\phi(t) - \phi(t - T_s)] dt = \int_{(t-T_s)}^{t} \phi(t) dt$$

An auxiliary carrier of center frequency $\nu/2\pi$ is $\cos(\nu t + \eta)$ where $\eta$ is an arbitrary phase. This carrier is modulated in phase by the signal (21); this results in

(22) $$\cos (\nu t + \eta + \theta_s)$$

Where $\nu$ is defined as the circular frequency of an auxiliary carrier signal.

The signals (21) and (22) are then mixed, and the difference term is proportional to $\cos \theta_s$. (See Equation 18.)

I claim:

1. Apparatus for measuring the range of a distant object, comprising a source of periodic oscillations, a source of random signals for modulating said first source in frequency, means to radiate a randomly modulated electromagnetic wave, means to receive a wave reflected from the distant object, means to mix said reflected wave with a portion of said radiated wave, whereby a first beat signal is produced, said first beat signal being at least partly random and having associated therewith a certain time delay, said time delay depending on the range of the distant object, local means to generate a second beat signal, said second beat signal being responsive to said source of random signals and having associated therewith a known time delay, said known time delay corresponding to a known target range, and means concomitant therewith for comparing said first and second beat signals, whereby the range of the distant object is determined.

2. Apparatus as claimed in claim 1, wherein said local means for generating said second beat signal is made variable.

3. Apparatus as claimed in claim 1, wherein said local means comprises means to generate a group of standard beat signals, whereby the range scanning of multiple targets is realized.

4. Apparatus as claimed in claim 1, wherein said local means comprises variable means to generate a group of variable beat signals, whereby the range scanning of multiple targets is realized.

5. Apparatus for tracking a distant object, comprising, means to radiate an electromagnetic wave, said wave being modulated in frequency by a source of random signals, means to receive a wave reflected from the distant object, means to mix said reflected wave with a portion of said radiated wave, whereby a first beat signal is produced, said first beat signal being at least partly random, local means to generate a second beat signal, said second beat signal being responsive to said source of random signals, means to compare said first and second beat signals, and means responsive therewith for varying the time delay of said second beat signal, said second beat signal thereby becoming substantially identical to said first beat signal, whereby the distant object is tracked.

6. Apparatus for tracking a distant object, comprising, means to radiate an electromagnetic wave, said wave being modulated in frequency by a source of random signals, means to receive a wave reflected from the distant object, means to mix said reflected wave with a portion of said radiated wave, whereby a first beat signal is produced, said first beat signal being at least partly random and having a certain time delay associated therewith, local means to generate a second beat signal, said second beat signal being responsive to said source of random signals and having a known time delay associated therewith, means to compare said first and second beat signals, and means responsive therewith for varying said time delay of said second beat signal, said second beat signal thereby becoming substantially identical to said first beat signal, whereby the distant object is tracked.

References Cited in the file of this patent

UNITED STATES PATENTS

| | | |
|---|---|---|
| 2,236,893 | Chaffee | Apr. 1, 1941 |
| 2,253,975 | Guanella | Aug. 26, 1941 |
| 2,842,764 | Harvey | July 8, 1958 |